(12) United States Patent
Kohigashi et al.

(10) Patent No.: US 9,550,126 B2
(45) Date of Patent: Jan. 24, 2017

(54) INFORMATION PROCESSING DEVICE AND PROGRAM FOR INCREASING ITEM POWER WITH INCREASED PURCHASING

(71) Applicant: DeNA Co., Ltd., Tokyo (JP)

(72) Inventors: Sho Kohigashi, Tokyo (JP); Ryota Katsura, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 81 days.

(21) Appl. No.: 14/712,332

(22) Filed: May 14, 2015

(65) Prior Publication Data

US 2015/0336008 A1   Nov. 26, 2015

(30) Foreign Application Priority Data

May 23, 2014   (JP) .................................. 2014-106952

(51) Int. Cl.
*A63F 13/792* (2014.01)
*A63F 13/85* (2014.01)
*A63F 13/35* (2014.01)

(52) U.S. Cl.
CPC ............. *A63F 13/792* (2014.09); *A63F 13/85* (2014.09); *A63F 13/35* (2014.09); *A63F 2300/57* (2013.01); *A63F 2300/575* (2013.01)

(58) Field of Classification Search
CPC .... A63F 13/85; A63F 13/792; A63F 2300/57; A63F 2300/575
See application file for complete search history.

(56) References Cited

U.S. PATENT DOCUMENTS 7,955,175 B1 * 6/2011 Holloway ............. A63F 13/822
273/317.1
8,360,866 B2 * 1/2013 Van Luchene .......... A63F 13/85
463/25

(Continued)

FOREIGN PATENT DOCUMENTS

JP   2002-282554 A   10/2002
JP   2006-94877 A    4/2006

(Continued)

OTHER PUBLICATIONS

Japanese Patent Application No. 2014-106952:Decision to Grant mailed on Nov. 11, 2014.

(Continued)

*Primary Examiner* — William H McCulloch, Jr.
(74) *Attorney, Agent, or Firm* — Procopio, Cory, Hargreaves & Savitch LLP (57) ABSTRACT

An information processing device that is connected via a network to a terminal device operated by a player, and provides a game space to the terminal device, has a memory component for storing item information related to items that the player can purchase with virtual currency and that allow the player to gain an advantage in a game, and player information related to the items possessed by the player and to the status of the player in the game; an item provision component that receives item purchase requests from the terminal device and updates the item information and player information; and a game processor that receives player input to the terminal device and executes processing to move the game forward on the basis of the item information and the player information, and the power of an item is changed according to the number of players who have purchased that item.

8 Claims, 5 Drawing Sheets

(56) References Cited

U.S. PATENT DOCUMENTS

| | | | |
|---|---|---|---|
| 8,360,867 B2 * | 1/2013 | Van Luchene | A63F 13/85 463/25 |
| 8,439,759 B1 * | 5/2013 | Mello | A63F 13/85 463/42 |
| 8,758,119 B1 * | 6/2014 | Bronstein Bendayan | H04W 4/206 463/25 |
| 8,840,465 B2 * | 9/2014 | Mello | A63F 13/85 463/29 |
| 9,352,217 B1 * | 5/2016 | Curtis | G07F 17/3255 |
| 9,358,471 B1 * | 6/2016 | Mello | G06Q 10/10 |
| 9,387,403 B2 * | 7/2016 | Bronstein Bendayan | H04W 4/206 |
| 2008/0207327 A1 * | 8/2008 | Van Luchene | A63F 13/12 463/42 |
| 2015/0336008 A1 * | 11/2015 | Kohigashi | A63F 13/35 463/25 |

FOREIGN PATENT DOCUMENTS

| | | |
|---|---|---|
| JP | 2008-246150 A | 10/2008 |
| JP | 2010-178996 A | 8/2010 |
| JP | 2012-235871 A | 12/2012 |
| JP | 2014-50620 A | 3/2014 |

OTHER PUBLICATIONS

Japanese Patent Application No. 2014-106952:Office Action mailed on Aug. 12, 2014.

* cited by examiner

133 Item Information

| Rental item ID | Start time | Number of purchasers | Power | Owner player | Purchasing players |
|---|---|---|---|---|---|
| a0001 | 2014/05/16 12:25 | 8 | 80pw | A | A,A,D,G, ••• |
| a0002 | 2014/05/16 18:12 | 3 | 30pw | C | C,H,K |
| ⋮ | | | | | |
| c0011 | 2014/05/16 12:30 | 3 | 1st | A | A,,G,L |
| c0012 | 2014/05/16 18:34 | 10 | 5st | C | A,C,D,H, ••• |
| ⋮ | | | | | |

INFORMATION PROCESSING DEVICE AND PROGRAM FOR INCREASING ITEM POWER WITH INCREASED PURCHASING

This application claims the benefit of foreign priority under 35 USC 119(a) based on Japanese Patent Application No. 2014-106952, filed May 23, 2014, the contents of which is incorporated herein by reference in its entirety.

BACKGROUND

1. Technical Field

The present invention relates to an information processing device, etc., that provides a space to play a game, and more particularly relates to an information processing device, etc., with which the user can relatively easily acquire items that give the user an advantage in a game, and which makes the game more interesting.

2. Related Art

Services that provide a space for game play on a portable terminal or a personal computer via a network have become popular in recent years. Many different games are available, such as fighting games, role playing games, and puzzle games. Many of these games involve multiple users (players), who compete against each other.

Also, some of these games involve the use of paid-for items that allow the player to gain an advantage in the game, and the users can purchase these items with virtual currency or the like.

With such games that involve paid-for items, however, users can be divided into two main groups: those who want to play without spending any money, and those who purchase a number of items. Because of this, there is the risk that users who do not purchase items will lose interest and leave the game because they are at a disadvantage to those who do purchase items.

The following Patent Document 1 proposes a way to deal with this problem. With the game operating device discussed in said publication, a new option is provided to boost capabilities without solely relying on charging fees. In order to realize a game that players will want to play continuously, when a player deposits virtual currency, that player will earn a benefit that gives them an advantage in battle.

PRIOR ART LITERATURE

Patent Literature

[Patent Document 1]
Japanese Laid-Open Patent Application 2012-235871

SUMMARY

The approach discussed in the above-mentioned Patent Document 1 does indeed lower the threshold for acquiring an item, but there is a need for a technique with which the purchase of items is further promoted, and the game is made more interesting, when multiple players are involved.

In view of this, it is an object of the present invention to provide an information processing device, etc., that provides a space in which to play a game, with which the user can relatively easily acquire items that give the user an advantage in a game, and which makes the game more interesting.

To achieve the stated object, one aspect of the present invention is an information processing device that is connected via a network to a terminal device operated by a player, and that provides a game space to said terminal device, said information processing device comprising a memory component for storing item information related to items that the player can purchase with virtual currency and that allow the player to gain an advantage in a game, and to the power of said items, and player information related to the items possessed by the player and to the status of the player in the game, an item provision component that receives the item purchase requests transmitted from the terminal device, updates the item information and player information stored in the memory component, and a game processor that receives player input to the terminal device and executes processing to move the game forward on the basis of the item information and the player information stored in the memory component, and the power of an item is changed according to the number of players who have purchased that item.

In a preferred mode of the above invention, the power of an item is increased as the number of players who have purchased said item increases.

In a preferred mode of the above invention, there is further provided a notification component that, when the item provision component has received an item purchase request, gives a notification to the effect that an item has been purchased to players other than the player who has sent the item purchase request.

In a preferred mode of the above invention, the player information includes information about players who are friends with said player, and the notification component gives a notification to the effect that an item has been purchased to players who are friends of the player who sent the item purchase request, on the basis of this information about friend players.

In a preferred mode of the above invention, the notification component is such that the notification to the effect that an item has been purchased includes the player information about the player who sent the item purchase request, information related to the power of the item, and information related to the number of players who have purchased the item.

In a preferred mode of the above invention, the item provision component puts a limit on the number of times an item is purchased.

In a preferred mode of the above invention, the player can use the item an unlimited number of times within a limited time period.

In a preferred mode of the above invention, the limited time period is started at the time when the corresponding item is first purchased.

In a preferred mode of the above invention, there is further provided an information provision component that receives an information display request sent from the terminal device, and displays the information stored in the memory component on said terminal device.

To achieve the stated object, another aspect of the present invention is a program (e.g., a non-transitory computer readable medium having machine-executable instructions) with which a computer connected via a network to a terminal device operated by a player is made to execute processing to provide a game space to said terminal device, wherein the computer comprises a memory component for storing item information related to items that the player can purchase with virtual currency and that allow the player to gain an advantage in a game, and to the power of said items, and player information related to the items possessed by the player and to the status of the player in the game, the computer executes an item provision step of receiving the item purchase requests transmitted from the terminal device, updating the item information and player information stored in the memory component, a game processing step of receiving player input to the terminal device and executing processing to move the game forward on the basis of the item information and the player information stored in the memory component, and the power of an item is changed according to the number of players who have purchased said item.

BRIEF DESCRIPTION OF THE DRAWINGS

FIG. 1

A diagram of the configuration of a network pertaining to an embodiment of an information processing device to which the present invention is applied.

FIG. 2

A diagram of the configuration of the functions pertaining to this embodiment of a game provision server 1.

FIG. 3

A diagram showing an example of player information 132.

FIG. 4

A diagram showing an example of item information 133.

FIG. 5

A diagram showing an example of a start screen.

FIG. 6

A flowchart showing an example of the processing procedure pertaining to purchasing items.

DETAILED DESCRIPTION

Embodiments of the present invention will now be described through reference to the drawings. However, the technological scope of the present invention is not limited to or by these embodiments, and extends to what is discussed in the patent claims and to equivalents thereof.

Figure 1:
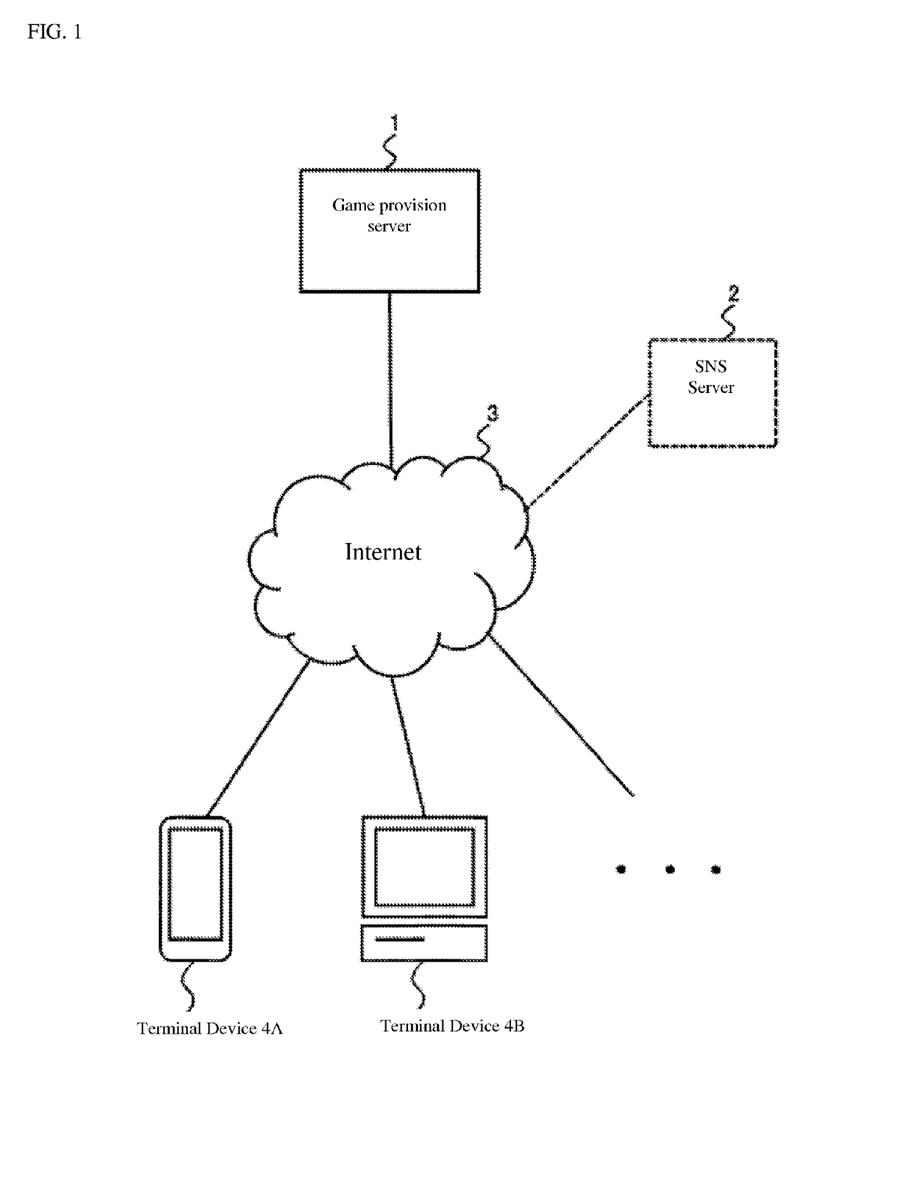

FIG. 1 is a diagram of the configuration of a network pertaining to an embodiment of an information processing device to which the present invention is applied. The game provision server 1 shown in FIG. 1 is an information processing device to which the present invention is applied, and provides a space for playing a game to the operator of a terminal device 4 that is connected via the Internet 3. This game provision server 1 provides paid-for items (by spending virtual currency) that allow the player to gain an advantage in the game, and of these, rental items are less expensive than items that are purchased outright, and the effect (power) of an item is increased according to the number of players who have acquired it. Furthermore, when a player acquires a rental item, players who are friends of that player are sent information about this, such as the fact that acquisition has been made, the power of that item, and so forth. This processing with the game provision server 1 allows a player to acquire items more easily than in the past, and offers a more interesting game that takes friends into account.

As shown in FIG. 1, the game provision server 1 pertaining to this embodiment is connected via the Internet 3 or another such network so that it is able to communicate with a plurality of terminal devices 4 (4A, 4B, etc.). The terminal devices 4 are used by players who play in a game (space) provided by the game provision server 1, and are constituted by so-called smartphones, tablet terminals, personal computers, portable telephones, and so on. The terminal devices 4 are each equipped with a so-called browser for acquiring and browsing through information by accessing various devices (various sites on the Internet 3) connected to the Internet 3, and/or a game application provided by the game provision server 1. Each player uses the browser and/or application to access the game provision server 1 and play the desired games. The terminal devices 4 are similar to ordinary devices in that they are equipped with a control device, a display device, an input device, a communication interface, and so forth. An SNS (Social Networking Service) server 2 is the server system of the so-called SNS provider, and stores member registration information, information about contributions from members, information related to friends who are members, and the like, and provides a place for socializing among members.

The games provided by the game provision server 1 may be any game that allow the player to gain an advantage in the game, but in the example of this embodiment, it is a puzzle game in which a plurality of stages are successively cleared.

Let us assume that the operators of the terminal devices 4, that is, the users of the game provision server 1, are players of that game. The scores (points) the players have earned are added each time the players clear a stage, and the players enjoy competing against other players for highest score, number of stages cleared, and so forth. A strength level is set for each player, and the game cannot be played when this value drops to zero. Each player is given a strength level of "5" at the initial stage, and that value drops (is used up) by "1" every time a player attempts a stage. The level drops another "1" if the player fails to clear a stage. This strength level is restored over time, and when the game has not been played for a specific length of time, the value is restored (increased) by "1". There are conditions for clearing each stage, and we will assume that these also include time limits.

There are two types of items available in this puzzle game. The first is bought items, which the player purchases using a specific virtual currency (game coins, points, or the like that can be used in this game), and these items can be used with no time limits. Bought items with a variety of power levels are available.

The second type is rental items. Providing these items is a characteristic feature of the game provision server 1. Rental items are items whose power increases in proportion to the number of players who have acquired (purchased) them. Rental items are purchased with virtual currency just like the bought items, but they are less expensive than the bought items, and their power is lower than that of bought items at the stage when the number of purchasing players is one. The prices of rental items and the power corresponding to the number of purchasing players are predetermined for each item and are stored as master data. Power can be increased in a number of ways, such as continuously increasing it every time the number of purchasing players increases, or increasing it intermittently whenever a specific number of people is reached. For example, the power can be successively increased when the number of purchasing players reaches three, five, and ten people. How long a rental item can be used is set (with a time limit); for instance, it may be set to 24 hours after purchase, and the item can be used any number of times within this time limit. This time limit is commenced when the first purchasing player for that rental item (hereinafter referred to as the owner player) has made a purchase.

The power of an item can be, for example, to augment the ability to clear a stage, to reduce the steps needed to clear a stage, to extend the time limit, or the like. There is a limit to the number of rental items that can be purchased by a single player.

Also, a puzzle game is a concept that involves "friend players", and the above-mentioned rental items can be purchased together with these "friend players". Information about the "friend players" of each player is recorded as friend information.

Figure 2:
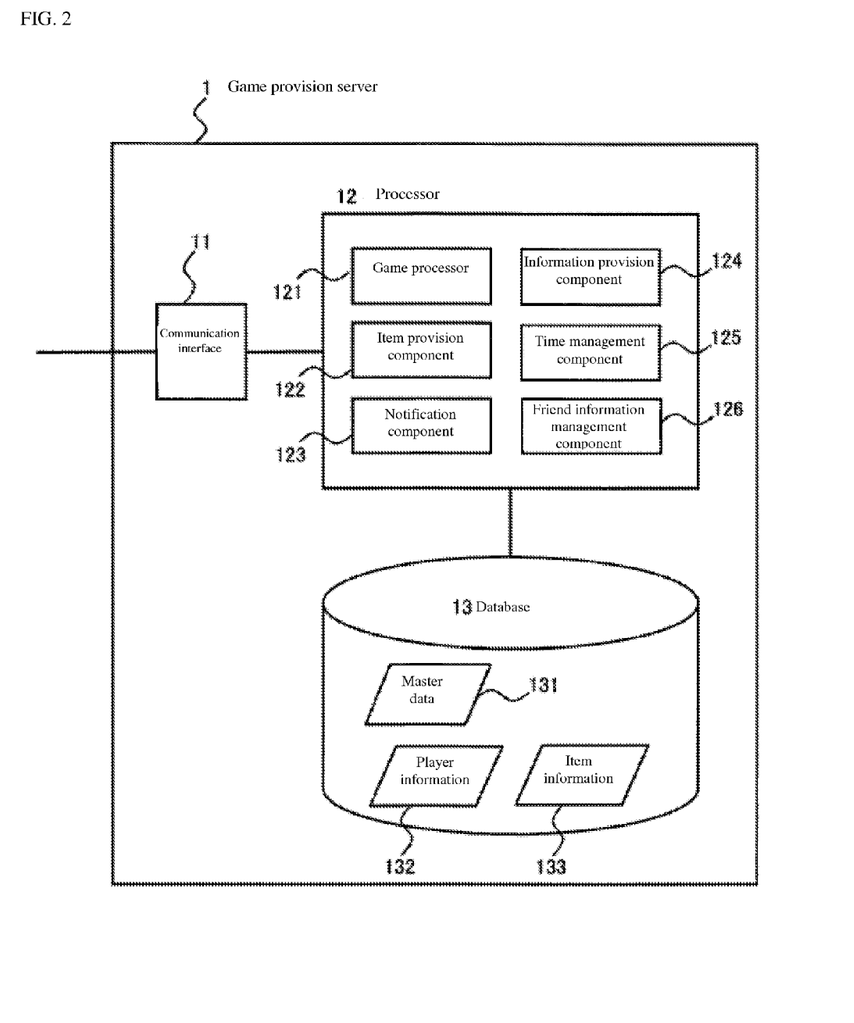

Next, the internal configuration of the game provision server 1 will be described. FIG. 2 is a diagram of the configuration of the functions pertaining to this embodiment of the game provision server 1. The game provision server 1 is a server system managed by a person who runs a game provision service, and is constituted by a computer system. Therefore, although not depicted, it comprises a CPU, RAM, ROM, hard disk drive, display device, input device, and the like.

As shown in FIG. 2, the functional configuration of the game provision server 1 comprises a communication interface 11, a processor 12, and a database 13 (memory component). The communication interface 11 is a portion that handles communication with other devices, and communicates with the terminal devices 4 via the Internet 3.

The processor 12 executes processing to provide a game (game provision processing), and has the functional configuration shown in FIG. 2. A game processor 121 is a portion that handles the overall game provision processing, and performs processing related to login, provision of basic menus, game progress, and so forth.

An item provision component 122 executes processing to provide the above-mentioned items to players. A notification component 123 sends friend players information related to the purchase of rental items. The item provision component 122 and the notification component 123 are characteristic features of the game provision server 1, and the processing they perform will be described in detail below.

An information provision component 124 provides information about the player himself and about other players, and provides the player with information pertaining to the current game progress of each player (called status information here).

A time management component 125 handles the management of time as it relates to the game, and in particular manages the above-mentioned time limit of rental items.

A friend information management component 126 manages information about the above-mentioned "friend players", and updates friend information when a friend player is added, for example, on the basis of a player request (input).

The various parts (121 to 126) of the processor 12 discussed above are constituted by programs (e.g., a non-transitory computer readable medium having machine-executable instructions) that set the procedure for processing, a CPU for executing processing according to these programs, and so on.

The database 13 is a memory component that stores various kinds of information needed for game provision processing, and is constituted by a hard disk drive or the like. As shown in FIG. 2, the information stored in this database 13 includes master data 131, player information 132, and item information 133.

The master data 131 is registration information for each player (such as the player name, contact information, and information pertaining to login verification and payment method) and information about game rules (such as conditions for clearing each stage, and the price and power of items). Also included here is information related to the price of the above-mentioned rental items and power corresponding to the number of purchasing players. The master data 131 is stored ahead of time, before the start of the game.

Figure 3:
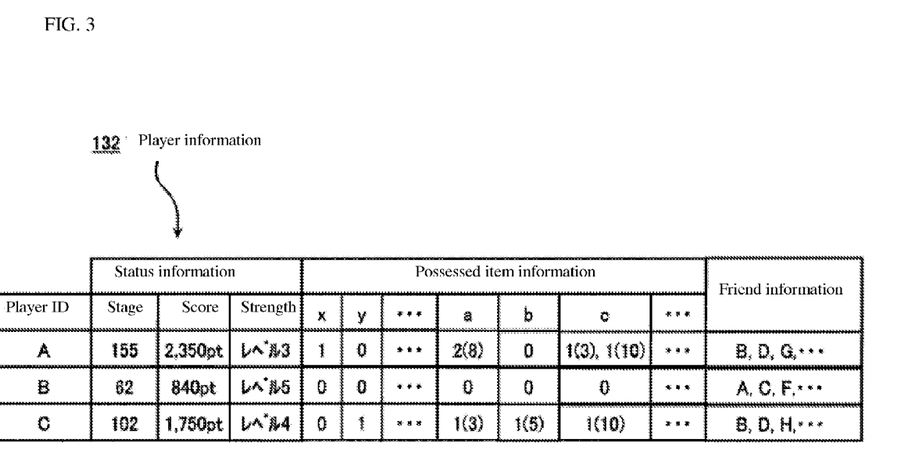

The player information 132 is information for each player, including each player's status information, possessed item information, friend information, and so forth, and is used in the progress of the game, the provision of information, and so on. FIG. 3 shows an example of the player information 132. As shown in FIG. 3, the player information 132 gives the above-mentioned "status information", "possessed item information", "friend information", and so forth for each "player ID".

A "player ID" is player identification information, and herein refers to information about a player "A" who uses a terminal device 4A, a player "B" who uses a terminal device 4B, and so on.

"Status information" includes the "stages" that have been cleared so far, the "score" that has been earned so far, as well as the current "strength" level. For example, player A has cleared up to stage 155, has accumulated 2,350 points, and has a strength level of 3.

"Possessed item information" is information about the number of items currently possessed by each player, with x, y, . . . indicating bought items, and a, b, c, . . . indicating rental items. The numbers in parentheses for rental items indicate the number of purchasing players for those items. Although there is an upper limit to the number of rental items, a given player may possess a plurality of items of the same type. In that case, there are situations in which the player buys a plurality of items from the same source, and situations in which the player buys items from different sources. The term source here means that the owner player has purchased that item.

Although not depicted in the drawings, identification information (rental item ID) for each source is attached to purchased rental items.

In FIG. 3, for example, player A currently possesses one bought item x, two rental items a, and two rental items c. The possessed items a are indicated as "2 (8)", which tells us that there are two rental items a from the same source, and the number of purchasing players currently having this item is 8. Since player A has purchased two of these items, player A counts for two of the purchasing players. These two items a both have the same rental item ID.

The two possessed items c are indicated as "1 (3)" and "1 (10)". This means that the player possesses two items c from different sources. A different rental item ID is attached to each of these two items c. Also, it is possible that these two items c have different power, since the number of purchasing players is different.

"Friend information" is the "player ID" for a player registered as a friend player for another player. In FIG. 3, for example, this friend information tells us that player A is a friend with players B, D, G, etc.

Figure 4:
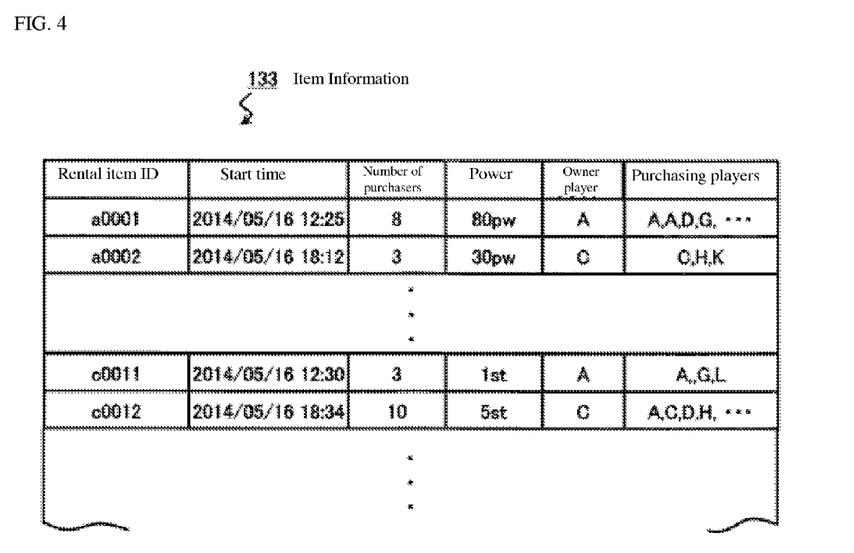

Returning to FIG. 2, the item information 133 is information about the rental items currently in effect. FIG. 4 shows an example of the item information 133. As shown in FIG. 4, the item information 133 includes the starting time for a time limit, the number of purchasing players so far, the current power, the owner player, the player ID for purchasing players, and so forth for each of the above-mentioned rental item IDs, that is, for each item with the same source.

The rental items a0001 and a0002 shown in FIG. 4 correspond respectively to the items a indicated respectively as "2 (8)" and "1 (3)" and possessed by the players A and C in the example in FIG. 3. The rental items c0011 and c0012 shown in FIG. 4 correspond to the items c indicated respectively as "1 (3)" and "1 (10)" and possessed by the players A and C in the example in FIG. 3.

In the example in FIG. 4, the rental item a0001 was first purchased by player A, the purchase time is given as "5/16/2014 12:25", "8" players have purchased it so far, and its power is given as "80". For the rental item c0011, it is indicated that its power is advantageous in the "1st" step.

With the game provision server 1 having the configuration described above, game provision processing is performed as follows.

First, the user of the game to be played (player A, as an example) uses an application and/or a browser from the terminal device 4A to access the game provision server 1, and then inputs a password or performs another such operation to log in to the game provision service.

With the game provision server 1, when a login operation is performed, the inputted information is compared to the master data 131, and if it is verified, login is permitted and the top screen of the game provision service is generated and sent to the terminal device 4A.

When the player performs an operation on this top page to select a game on the terminal device 4A, the game processor 121 of the game provision server 1 accesses the player information 132 for the game selected by this operation, generates a start screen from the status information and so forth, and sends this to the player's terminal device 4A.

Figure 5:
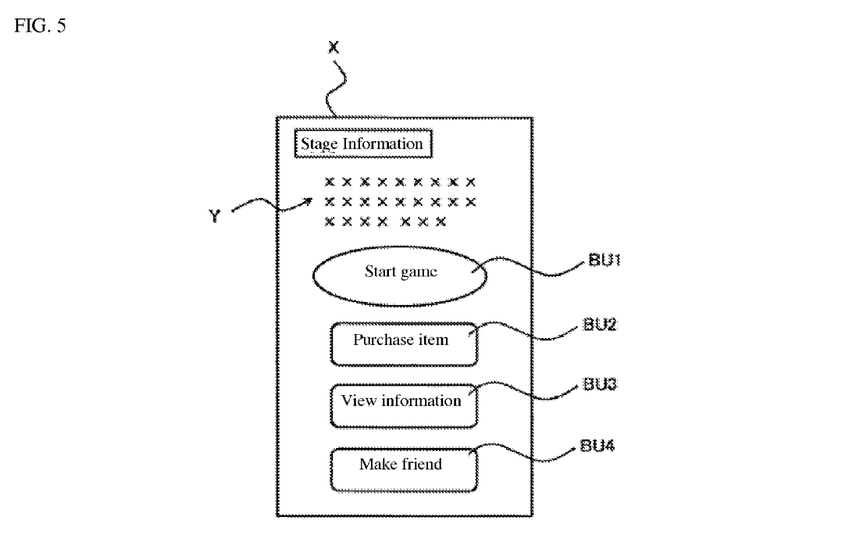

FIG. 5 is an example of this start screen. The screen indicated by X in FIG. 5 is the start screen, and information about the player's next stage is displayed (Y in the drawing) as "stage information" at the top part of the screen. This information is generated from the master data 131 and from information about the "stages" cleared so far in the above-mentioned status information.

Four menu buttons are displayed under this "stage information". The player may select any one of these, but we will describe the procedure when the player checks the information, increases his friend players, purchases items, and then starts the game.

First, to check information, the player performs an operation to designate the button for "view information" (BU3) on the start screen displayed on the terminal device 4A. Upon receiving this operation, the information provision component 124 of the game provision server 1 generates a screen that asks which information is to be provided, and sends this screen to the terminal device 4A. The player inputs the information to be provided on this screen, whereupon the information provision component 124 accesses the player information 132 and extracts the information requested by the player. An information provision screen is generated from the extracted information, and this screen is sent to the terminal device 4A. For example, the player information 132 for the player himself, player information 132 for friend players of this player, and player information 132 for other players are provided on the information provision screen. The transmitted information provision screen is displayed on the terminal device 4A and viewed by the player. The processing done by the information provision component 124 can also be executed from a similar menu prepared for a screen other than the start screen.

Once the player has looked at this information and ascertained the situation regarding items possessed by himself and items possessed by other players, and has considered the purchase of the next rental item, he may be motivated to make a friend player (to increase the number of friend players). For instance, if he himself is the owner player, he may want more players to purchase that item, or may want to become friends in order to purchase rental items whose power has already increased due to being purchased by more players.

In this situation, the player performs an operation to designate the button "make a friend" (BU4) on the start screen. Upon receiving this operation, the friend information management component 126 of the game provision server 1 generates a screen designating a player with whom the first player wants to become friends (from the master data 131, the player information 132, and so forth) and sends this to the terminal device 4A. This screen has a field for inputting a player ID, a field for selecting players and a player list, and so forth. When a player is designated on this screen, the friend information management component 126 sends the player designated by this operation a notification asking whether or not he approves becoming a friend player with that player. This notification is accomplished by means of a message or chat within the game, or an e-mail or the like.

The player who has received this notification sends a reply as to whether or not he approves becoming a friend player, from the terminal device 4 to the game provision server 1. The friend information management component 126 receives this reply and, if the player has approved becoming a friend, updates the friend information of the player information 132 for both players. That is, the player ID for the players that have become friends here is added to their friend information.

The processing performed by the friend information management component 126 to make a friend may be performed by using the functionality of the SNS server 2. In this case, it will be necessary for the SNS login information (ID, password, etc.) provided by the SNS server 2 to be registered for every player in the master data 131. First, the friend information management component 126 logs in to this SNS with the login information for the player who wants to make a friend, and sends the player with whom he wants to become friends a friend request using that player's ID. The friend information management component 126 receives the reply to this request (for example, acquires information by periodically accessing the SNS server 2), and updates the friend information as discussed above according to the result of the reply.

The processing performed by the friend information management component 126 can also be executed from a similar menu prepared for a screen other than the start screen.

Figure 6:
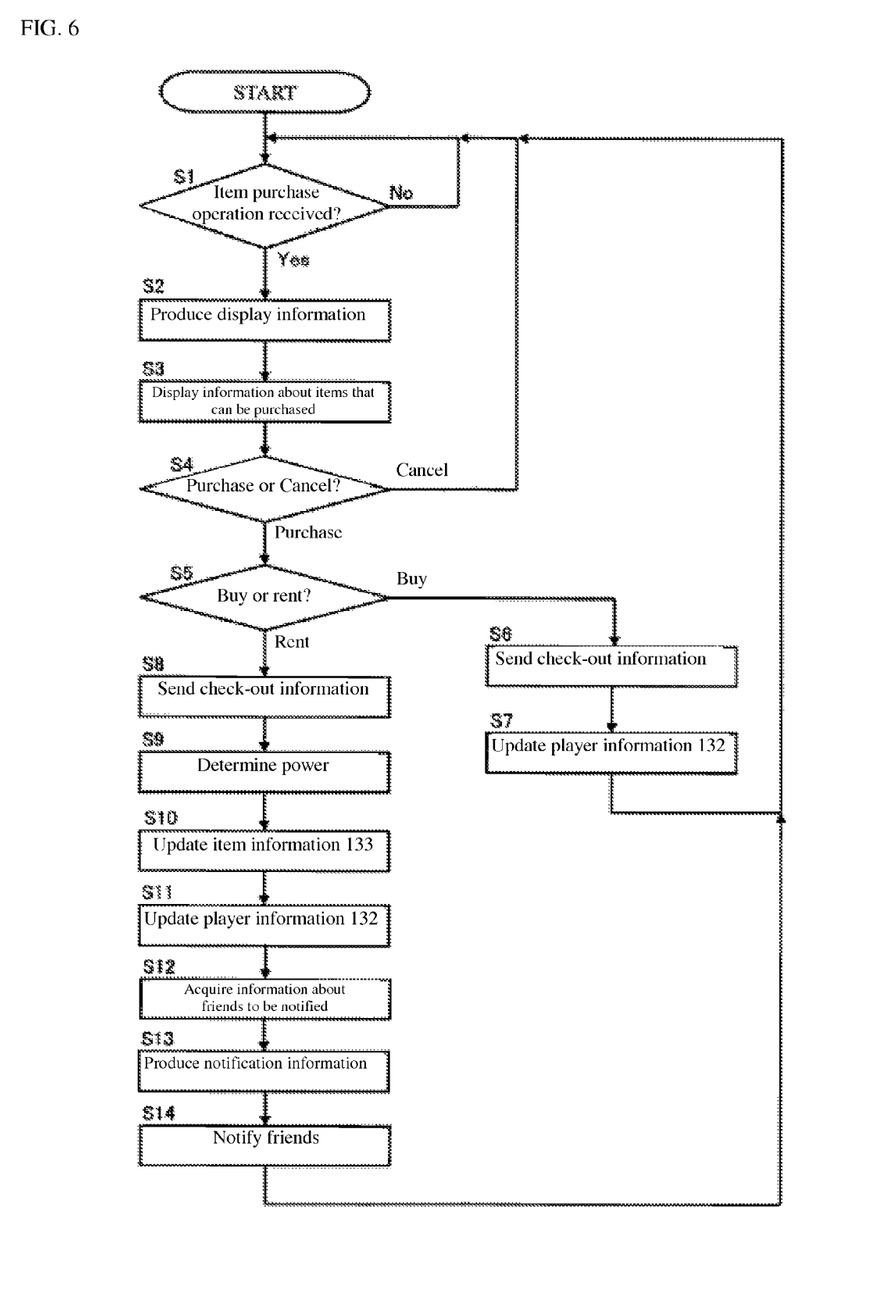

The processing when a player purchases an item will now be described. FIG. 6 is a flowchart showing an example of the processing procedure pertaining to purchasing items. When a player purchases an item, he presses the button "purchase an item" (BU2) on the start screen shown in FIG. 5. This operation can also be executed from a similar menu prepared for a screen other than the start screen. When this operation is performed, the item provision component 122 of the game provision server 1 receives the operation (Yes in step S1 in FIG. 6). The item provision component 122 is on standby until receiving this operation (No in step S1 in FIG. 6).

Upon receiving this operation, the item provision component 122 generates information to be displayed for the player (step S2 in FIG. 6). More specifically, list information for the items that can be purchased by the player at this point is generated by referring to the master data 131, the player information 132, and the item information 133. This information includes information about bought items and rental items. Information about bought items includes information about items that have not reached the possession quantity limit (the current number possessed is ascertained by referring to possessed item information in the player information 132). This information includes information about price and power.

For rental items, those that this player is able to purchase are extracted from among the items included in the above-mentioned item information 133, and are included in said information. The rental items that each player is able to purchase here will vary depending on if that player is the owner player, if it is an item for which that player is already the owner player, or if a friend player of that player or a friend player of that friend player is the owner player, and in every case there are limits on the number of items possessed. Here, a rental item can be purchased if a friend of a friend is the owner player, that is, within a range of two degrees of friendship, but the number of degrees of friendship in which a purchase is possible can be set as desired. Again in the case of rental items, information about the price of each item and its power at that point in time is included. Information about the owner player and the purchasing players may also be included.

When information about items that can be purchased is generated for display to the player, the item provision component 122 sends this information display screen to the terminal device 4A, and that screen is displayed (step S3 in FIG. 6).

The item provision component 122 waits for the player to perform an operation on the displayed screen, and if the content of a received operation indicates to "cancel" a purchase ("cancel" in step S4 in FIG. 6), the processing returns to step S1, and the next item purchase operation is awaited.

Meanwhile, if the content of a received operation indicates to "purchase" an item ("purchase" in step S4 in FIG. 6), the item provision component 122 identifies whether the item whose purchase has been requested is a bought item or a rental item (step S5 in FIG. 6).

If the item whose purchase has been requested is a bought item ("buy" in step S5 in FIG. 6), the item provision component 122 determines that this item was purchased, and sends the check-out information thereof (the purchased item, the quantity, etc.) to the game processor 121 (step S6 in FIG. 6). The game processor 121 receives this information and refers to the master data 131 to perform specific payment processing.

Next, the item provision component 122 reflects the information about the purchased item in the player information 132 for that player who has made the purchase, that is, performs processing to update the player information 132, and provides this item to the player (step S7 in FIG. 6). More specifically, information about the purchased item is added to the possessed item information. The item provision processing for bought items is concluded at this point, after which the processing returns to step S1.

Meanwhile, if the item whose purchase has been requested is a rental item ("rental" in step S5 in FIG. 6), the item provision component 122 determines that this rental item has been purchased, and sends the check-out information thereof (the purchased item, the quantity, etc.) to the game processor 121 (step S8 in FIG. 6). The game processor 121 receives this information and refers to the master data 131 to perform specific payment processing.

Next, the item provision component 122 determines the power of the purchased rental item (step S9 in FIG. 6). As discussed above, the correlation between power and the number of players who have purchased a rental item is kept in the master data 131, so the item provision component 122 refers to this information to determine the power.

After this, the item provision component 122 reflects the content of this item purchase in the item information 133 (step S10 in FIG. 6). That is, the item information 133 is updated with new information including information about the power determined as above. If this rental item is one for which this player is the owner player, information about that item is added.

The item provision component 122 also reflects information about the purchased item in the player information 132 for the player who has made the purchase, that is, performs processing to update the player information 132, and provides this player with this item (step S11 in FIG. 6). More specifically, information about the purchased item is added to the possessed item information. The item provision component 122 then notifies the notification component 123 of the fact that a rental item has been purchased, the player ID for the player who has made the purchase, and the rental item ID for the purchased rental item.

The above processing concludes the processing to provide a rental item, and the item provision component 122 returns the processing to step S1 and waits for the next item purchase operation.

Meanwhile, upon receiving the above-mentioned notification, the notification component 123 executes processing to report to (notify) friend players of the fact that the above-mentioned rental item has been purchased. More specifically, first information about friend players to receive notification is acquired (step S12 in FIG. 6). That is, the player information 132 is accessed, stored friend information is acquired for the player ID of the player who has purchased this rental item, and stored friend information is acquired for the player ID of the players included in this friend information. As discussed above, in an example here, rental items can be purchased within a range of two degrees of friendship, so information about friend players is acquired within that range. If the purchase possibility range is different, then information about friend players within that range is acquired.

Next, the notification component 123 generates the information for the notification (step S13 in FIG. 6). More specifically, the item information 133 is accessed, and information stored for the rental item ID for the above-mentioned purchased rental item and the like is used to generate information about the type of rental item purchased this time, its current power, the purchaser this time, the current number of purchases, the number of purchases until the next time the power is raised, the price, and so forth.

After this, the notification component 123 sends (notifies) the generated information to the friend players included in the friend information acquired above (step S14 in FIG. 6). More specifically, contact information about the friend players being notified is acquired from the master data 131, and notification is performed by sending in-game messages. At this point, friend players who are currently accessing the game provision server 1 are sent a notification screen to the terminal devices 4 of those players as the screen of said game provision service. This notification may also be accomplished by means of a chat, e-mail, SMS, SNS posting, or the like.

This concludes the processing in the purchase of a rental item, and the processing returns to step S1.

The same processing is performed every time a player performs an operation to purchase an item.

Next, returning to FIG. 5, if the player wants to start a game, he operates a "start game" button (BU1) on the start screen. Upon receiving this operation, the game processor 121 of the game provision server 1 executes processing to move the game forward. In this processing, the game processor 121 refers to the master data 131, the player information 132, and the item information 133, and successively executes processing to provide a game screen, receive player input, reflect the input operation results, and so forth. Since the above-mentioned purchased item is reflected in the player information 132, using this item can affect the progress of the game. When stage 1 is concluded, that result is reflected in the player information 132, that is, the "status information" in FIG. 3 is updated, and the start screen for the next stage of that player is displayed on the terminal device 4A. If the player fails this time to clear the stage, the start screen for the same stage is displayed. Thereafter the same processing is executed.

The time management component 125 of the game provision server 1 manages the time limits for the various stages, and notifies the game processor 121 as needed. The time management component 125 also manages the time limit for rental items by referring to the "start time" of the item information 133, deletes the item information 133 for an item whose time limit is up, and also deletes that item from the player information 132 for the player who possesses the item. The notification component 123 may perform processing to notify a player possessing the item to the effect that its time limit is nearly up.

In the embodiment described above, rental items could be purchased among players in a specific friendship relation, but it is also possible to configure the game so that any player can purchase them. In this case, the game can be configured so that with rental items of the same type, a plurality of items from different sources will not be present at the same time. Also, if anyone can purchase a rental item, then instead of, or in addition to, processing to notify friends when an item is purchased, players who have failed at the same stage or who challenge the same stage as players who have purchased an item may be similarly notified that an item has been purchased. Furthermore, players with many plays or many item purchases may be similarly notified.

Also, if rental items can be purchased only among players in a specific friendship relation as in the above embodiment, the above-mentioned notification that an item has been purchased may be given not only to players who are able to purchase an item, but also to players who have failed at the same stage or who challenge the same stage as players who have purchased an item, or to players with many plays or many item purchases. In this case, the notification is equipped with a function that allows for a request (application) to become a friend player with the player who has purchased an item. When this request is made, the friend information management component 126 executes the above-mentioned processing to become friend players.

As described above, with the game provision server 1 pertaining to this embodiment and its modification examples, lower-cost rental items are available in addition to the conventional bought items, so the threshold for item purchase is lowered, which makes it easier for players to purchase items.

Also, since the power of a rental item increases when there are more purchasing players, a player can be aware of trends among other players, and can time his purchases and use of items, which makes the game more appealing.

Also, when a rental item has been purchased, friend players are notified to that effect, so these notified players will be motivated to purchase items out of a sense of competition and a sense of friendship.

Furthermore, in this notification, information about the number of purchases of this item and the number of purchases until its power is raised is included, so players are more strongly motivated to purchase just before the power goes up.

Also, the difference between players who have plenty of funds and players who do not can be reduced by limiting the number of rental items that a single player can purchase, and this creates better competition and greater enjoyment of the game.

Also, since the rental items can be used any number of times within their time limit, this option is appealing and promotes more purchases. As a result, there will be more players who play for a long time, making the game more lively.

Also, since the time limit for these rental items is commenced upon purchase by the owner player, a sense of fairness can be maintained between players who purchase near the start of this period and therefore have items that have lower power but can be used longer, and players who purchase near the end of this period and therefore have items that have higher power but can be used for less time.

Also, since players can display information about other players, there is a greater sense of competition and of wanting to become friends, which also makes the game more lively.

Also, a sense of balance can be maintained between bought items and rental items by setting the price and power of the former higher than those of the latter.

Also, item purchases can be increased and the game made more lively by also sending notifications that an item has been purchased to players on the same stage, etc.

Because of the above, more items will be purchased and the game will be more lively, so sales on the game provider side can also be expected to rise.

DESCRIPTION OF THE REFERENCE NUMERALS

1 Game provision server
2 SNS server
3 Internet
4 (4A, 4B) Terminal device
11 Communication interface
12 Processor
13 Database
121 Game processor
122 Item provision component
123 Notification component
124 Information provision component
125 Time management component
126 Friend information management component
131 Master data
132 Player information
133 Item information

The invention claimed is:

1. An information processing device that is connected via a network to a terminal device operated by a player, and that provides a game space to said terminal device, said information processing device performs:

storing item information related to items that the player can purchase with virtual currency and that allow the player to gain an advantage in a game, and to the power of said items, and player information related to the items possessed by the player and to the status of the player in the game;

receiving the item purchase requests transmitted from the terminal device, updating the item information and player information stored in the memory component, and increasing the power of the items as the number of players who have purchased said items increases;

receiving player input from the terminal device and executing processing to move the game forward on the basis of the item information and the player information; and giving a notification that an item has been purchased to players other than the player who has sent the item purchase request.

2. The information processing device according to claim 1, wherein the player information includes information about players who are friends with said player, and the information processing device gives a notification that an item has been purchased to players who are friends of the player who sent the item purchase request, information about friend players.

3. The information processing device according to claim 1, wherein the information processing device provides the notification that the item that has been purchased includes the player information about the player who sent the item purchase request, information related to the power of the item, and information related to the number of players who have purchased the item.

4. The information processing device according to claim 1, wherein the information processing device puts a limit on the number of times an item is purchased.

5. The information processing device according to claim 1, wherein the information processing device allows the player to use the item an unlimited number of times within a limited time period.

6. The information processing device according to claim 5, wherein the information processing device starts the limited time period at the time when the corresponding item is first purchased.

7. The information processing device according to claim 1, wherein the information processing device receives an information display request sent from the terminal device, and displays the stored information on said terminal device.

8. A non-transitory computer readable medium having machine-executable instructions with which a computer having a storage and a hardware processor connected via a network to a terminal device operated by a player is made to execute processing to provide a game space to said terminal device, wherein the computer comprises a memory that stores item information related to items that the player can purchase with virtual currency and that allow the player to gain an advantage in a game, and to the power of said items, and player information related to the items possessed by the player and to the status of the player in the game, and the computer executes: receiving the item purchase requests transmitted from the terminal device, updating the item information and player information stored in the memory, and increasing the power of the items as the number of players who have purchased said items increases;

receiving player input to the terminal device and executing processing to move the game forward on the basis of the item information and the player information stored in the memory; and giving a notification that an item has been purchased to players other than the player who has sent the item purchase request.

* * * * *